(12) United States Patent
Bauman et al.

(10) Patent No.: US 7,474,668 B2
(45) Date of Patent: Jan. 6, 2009

(54) FLEXIBLE MULTILEVEL OUTPUT TRAFFIC CONTROL

(75) Inventors: James Bauman, Los Gatos, CA (US);
Eric Anderson, Palo Alto, CA (US);
Gunes Aybay, Los Altos, CA (US);
Mike Morrison, Sunnyvale, CA (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1012 days.

(21) Appl. No.: 10/439,681

(22) Filed: May 16, 2003

(65) Prior Publication Data

US 2003/0231593 A1    Dec. 18, 2003

Related U.S. Application Data

(60) Provisional application No. 60/385,868, filed on Jun. 4, 2002.

(51) Int. Cl.
*H04L 12/28* (2006.01)
*H04L 12/56* (2006.01)

(52) U.S. Cl. .................. 370/412; 370/413; 370/416; 370/417; 370/235.1

(58) Field of Classification Search .............. 370/235.1, 370/412, 413, 414–419, 230–235, 229
See application file for complete search history.

(56) References Cited

U.S. PATENT DOCUMENTS

| | | | | |
|---|---|---|---|---|
| 6,046,979 A | * | 4/2000 | Bauman | 370/229 |
| 6,515,990 B1 | * | 2/2003 | Leung | 370/389 |
| 6,606,302 B2 | * | 8/2003 | Delattre et al. | 370/230.1 |
| 6,621,791 B1 | | 9/2003 | Davie | |
| 6,798,743 B1 | * | 9/2004 | Ma et al. | 370/235 |
| 7,065,573 B2 | * | 6/2006 | Byrnes | 709/224 |

\* cited by examiner

*Primary Examiner*—Edan Orgad
*Assistant Examiner*—Chuong T Ho (57) ABSTRACT

A two stage rate shaping and scheduling system and method is implemented to control the flow of traffic to at least one output interface. The system and method involves initially queuing incoming packets into type-specific queues and applying individual rate shaping rules to each queue. A first stage arbitration is performed to determine how traffic is queued from the type-specific queues to interface-specific queues. Packets that win arbitration and pass the applied rate shaping rules are queued in interface-specific queues. Rate shaping rules are applied to the interface-specific queues. The interface-specific queues are further distinguished by priority and priority-specific and interface-specific rate shaping rules are applied to each queue. A second stage arbitration is performed to determine how different priority traffic that is targeting the same output interface is dequeued in response to interface-specific requests.

17 Claims, 6 Drawing Sheets

| $I_{0-0}$ | $I_{0-1}$ | $I_{0-2}$ | $I_{0-3}$ | $I_{0-4}$ | $I_{0-5}$ | $I_{0-6}$ | $I_{0-7}$ | $I_{0-\text{Aggregate}}$ |

Interface-Specific
Rate-Shaping Information

FIG. 7B

FLEXIBLE MULTILEVEL OUTPUT TRAFFIC CONTROL

CROSS-REFERENCE TO RELATED APPLICATION

This application is entitled to the benefit of provisional U.S. patent application Ser. No. 60/385,868, filed 4 Jun. 2002.

FIELD OF THE INVENTION

The invention relates to traffic control techniques in a packet-based switch/router, and more particularly, to techniques for controlling the flow of packets through at least one output interface in a packet-based switch/router.

BACKGROUND OF THE INVENTION

Packet-based communications networks are known to have bursty traffic patterns. Network nodes (i.e., switches and routers) use memory buffers to store packets when traffic bursts cause packets to be received at a faster rate than they can be processed. Many traffic control techniques, such as rate shaping, rate limiting, and weighted random early drop (WRED), are used in conjunction with memory buffers to deal with bursty traffic.

On the output side of a network node, memory buffers are often used to temporarily store packets when packets are passing through the network node faster than the packets can be transmitted out onto their intended output links. One technique for controlling the flow of traffic is generally referred to as rate shaping. Rate shaping involves buffering packets as they arrive at a location and then controlling the flow of packets leaving the buffers according to a given algorithm to meet a desired rate profile. Because packets are buffered, bursts of packets can be absorbed and then dispatched in a controlled manner.

Communications links between network nodes in packet-based communications networks are often referred to as "interfaces." An interface can be a physical entity (i.e., a port of a switch/router) or a logical entity (i.e., a channel in a packet over SONET (POS) link. Because communications networks utilize a mix of different communication protocols, typical switch/routers can be equipped to handle different interface combinations. For example, different physical interface combinations may include twelve 1 gigabit Ethernet (GbE) ports, one 10 GbE port, four Optical Carrier (OC)-48 ports, and one OC-192 port.

Typical output traffic control implementations include one queue per interface to buffer output traffic. For example, an output traffic control system that serves four different interfaces would typically have four different queues. Rate shaping can then be applied to each one of the four different queues to achieve per-interface rate shaping. While per-interface rate shaping is desirable, in advanced communications networks, each interface may support a diverse mix of traffic types. With only one queue per interface, special rate shaping limitations cannot be applied to any one particular traffic type.

In addition to the limitations on rate shaping granularity that exist in typical output control system implementations, the hardware required to support each interface combination is typically custom designed for that interface combination. Custom designing hardware for each particular interface combination is a costly and time consuming task.

In view of the above-described shortcomings in the prior art, what is needed is output traffic control systems and methods that are able to provide multiple levels of rate shaping and that are flexible enough to be easily adapted to different interface combinations.

SUMMARY OF THE INVENTION

A two stage rate shaping and scheduling system and method is implemented to control the flow of traffic to at least one output interface. The two stage rate shaping and scheduling system and method involves initially queuing incoming packets into type-specific queues and applying individual rate shaping rules to each queue. A first stage arbitration is performed to determine how traffic is queued from the type-specific queues to interface-specific queues. Packets that win arbitration and pass the applied rate shaping rules are queued into the interface-specific queues. Rate shaping rules are then applied to the interface-specific queues. For a higher level of quality of service (QoS) control, the interface-specific queues are further distinguished by priority, and priority-specific as well as interface-specific rate shaping rules are applied to each queue. A second stage arbitration is performed to determine how different priority traffic that is targeting the same output interface is dequeued in response to interface-specific requests. Two stage shaping and scheduling enables traffic shaping to be applied individually to each different type of traffic as well as to each different interface on which traffic is output. In addition, because the type-specific shaping and queuing is separated from the interface-specific shaping and queuing, the interface-specific queue structure can be easily adapted to different interface configurations without requiring changes to the type-specific queue structure.

In an additional aspect of the invention, packets are initially written to a separate packet buffer (e.g., typically an off-chip packet buffer) and both stages of traffic shaping and scheduling are accomplished using queues that contain indicators of the packets. Once both stages of traffic shaping are complete, packets are read from the packet buffer and forwarded to the target interface. Because the two stages of traffic shaping and scheduling are done using queues that contain indicators of packets instead of the actual packets, the packets can be managed with a single write to and a single read from the packet buffer.

Another embodiment of the invention involves implementing rate shaping with hardware-based leaky buckets using an assumed length value in an initial credit bucket update. In particular, this embodiment involves making an assumption about the length of an incoming packet, using the assumed length for an initial rate shaping calculation, and then correcting the credit value for the respective queue to account for any difference between the assumed length and the actual length of each packet after the packet is fetched from a packet buffer and the actual length of the packet is learned. Making an initial rate shaping calculation with an assumed packet length and subsequently correcting for any differences between the assumed length and the actual length avoids the need either to maintain actual length information for each packet in the type-specific queues or to perform an extra memory read to ascertain length information before the rate shaping calculations can be completed. Although the assumed length typically does not match the actual length of the subject packet, the subsequent correction with actual length information resolves any differences to avoid injecting any error into the rate shaping operation. In a further embodiment, the assumed length is periodically adjusted to reflect the average length of packets that are seen in a particular type-specific queue.

Another embodiment of the invention involves distributing unused bandwidth for an interface among multiple subqueues in a manner that preserves the relative relationships of bandwidth allocations among the subqueues that have pending packets. In an embodiment, this "rate scaling" is achieved on a per-interface basis by increasing, by a common multiple, the credit refresh rate of all of the subqueues that have pending packets when none of those subqueues have a passing credit balance. Increasing the refresh rate of credit buckets by a common multiple accelerates the return of credit values back to passing values while allocating the excess bandwidth to the included subqueues in proportion to their original allocations. Additionally, since the refresh rates are increased only when there is unused bandwidth, the rate scaling does not alter the distribution profile of the committed bandwidth among a set of subqueues.

Other aspects and advantages of the present invention will become apparent from the following detailed description, taken in conjunction with the accompanying drawings, illustrating by way of example the principles of the invention.

DETAILED DESCRIPTION

Figure 1:
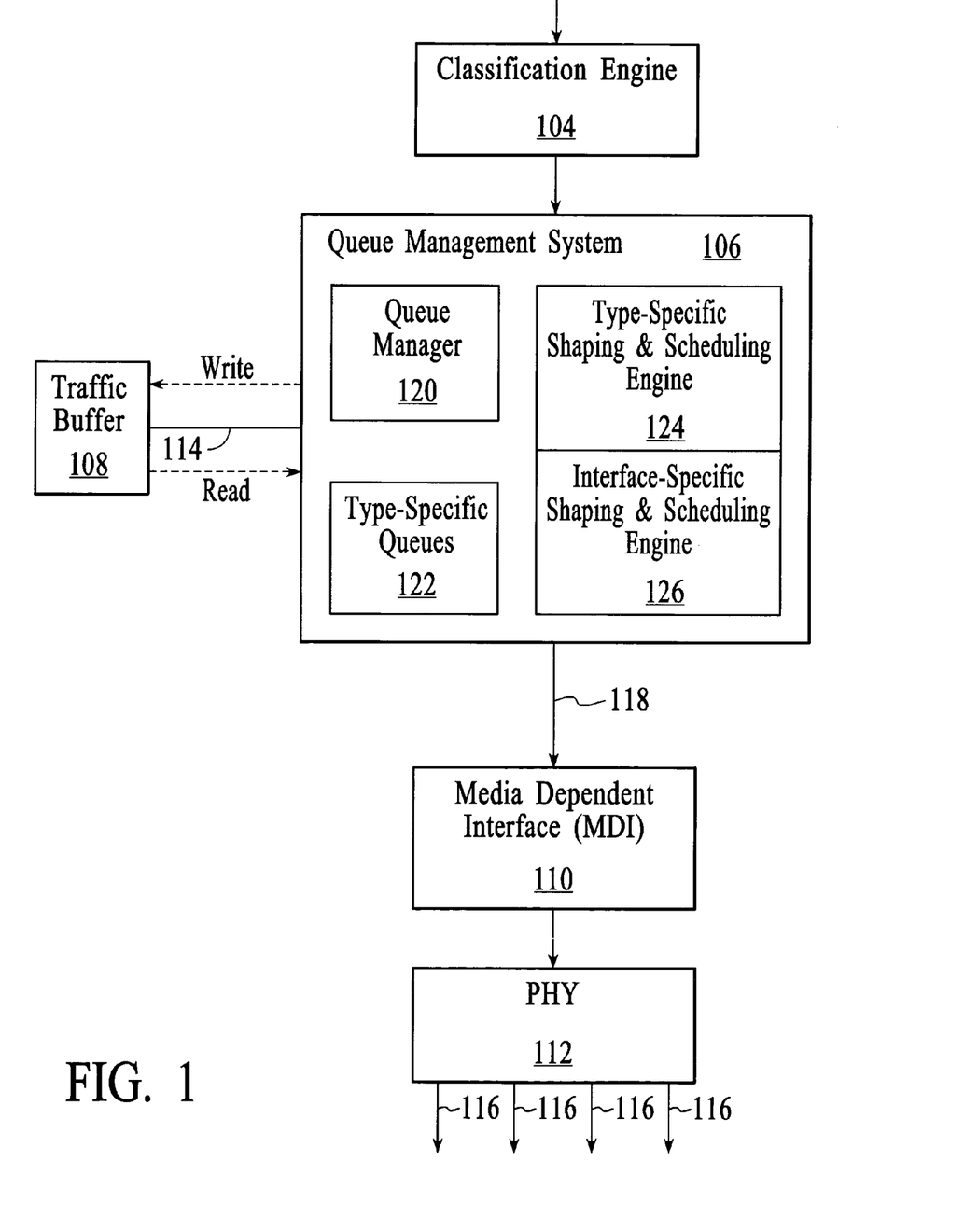
FIG. 1 depicts an embodiment of a system for controlling the flow of packets through at least one output interface in accordance with an embodiment of the invention.

FIG. 1 depicts an embodiment of a system for controlling the flow of packets through at least one output interface. The system includes a classification engine 104, a queue management system 106, a packet buffer 108, a media dependent interface (MDI) 110, and a physical layer module (PHY) 112. In an embodiment, the system is implemented in a network node such as a switch or a router. For example, the switch or router may be a packet-based switch/router, such as an Ethernet-based switch/router, that forwards traffic using layer 2, layer 3, and layer 4 header information, where the layers are defined by the International Organization for Standardization (ISO) in the open system interconnect (OSI) model. The packet-based switch/router may include line cards that support network protocols such as Ethernet, ATM, Frame Relay, and/or SONET.

The classification engine 104 classifies incoming packets based on characteristics of each incoming packet. For example, the classification engine reads header information from each packet to determine the traffic type. In an embodiment, the traffic type can be a function of such packet characteristics as source and/or destination media access control (MAC) address, source and/or destination Internet protocol (IP) address, virtual circuit (VC) identifier (ID), virtual local area network (VLAN) ID, ethertype, etc.

The queue management system 106 manages the transfer of packets between the classification engine and the PHY. The queue management system is the focus of the invention and is described in more detailed below.

The packet buffer 108 temporarily stores incoming traffic. In an embodiment, the packet buffer includes DRAM that is connected to the queue management system by a communications bus 114 that enables traffic to be written into the packet buffer and read out of the packet buffer. In the embodiment of FIG. 1, the packet buffer is an "off-chip" memory structure that exists on a separate integrated circuit (IC) chip from the queue management system 106.

The MDI 110 provides the interface between the queue management system 106 and the PHY 112. The MDI manages the allocation of bandwidth to the interfaces 116 that are supported by the PHY. For example, if the PHY supports four interfaces (e.g., corresponding to four physical interfaces), then the MDI initiates the forwarding of packets to each of the four interfaces. Likewise, if the PHY supports 192 interfaces (e.g., corresponding to 48 logical interfaces on each of four physical interfaces), then the MDI initiates the forwarding of packets to each of the 192 interfaces. The MDI may be integrated with the PHY or on a separate IC from the PHY. Additionally, the MDI may include multiple different MDI devices (e.g., separate IC devices). In the embodiment of FIG. 1, the link 118 between the queue management system 106 and the MDI has limited bandwidth and buffering capacity and therefore traffic must be forwarded from the queue management system to the MDI in a controlled manner. The MDI manages the allocation of bandwidth between the queue management system and the PHY by arbitrating among the active interfaces in the case where there is more than one interface, and then providing interface-specific requests to the queue management system. The interface-specific requests act as the authorization for the queue management system to release packets to the MDI and eventually to the PHY. The techniques used to arbitrate among the active interfaces and generate interface-specific requests are beyond the scope of the invention and are not described further herein.

The PHY 112 is responsible for the transmission and reception of signals across the communications link or links 116. On the output side of a switch/router, the PHY encodes a data stream into a string of optical or electrical signals that are appropriate for the particular technology that is in use. The specifics of the PHY are directly dependent on the particular technologies (e.g., physical layer protocols) that are in use. As an example, the PHY may support twisted pair wire connections, optical fiber connections, and wireless RF connections. Different physical interface combinations may include twelve 1 GbE ports, one 10 GbE port, four OC-48 ports, and one OC-192 port while logical interface combinations may include sixteen OC-12 channels distributed over four OC-48 ports or 192 OC-1 channels (also referred to as DS3 channels) distributed over an OC-192 port.

In the embodiment of FIG. 1, the queue management system 106 includes a queue manager 120, type-specific queues 122, a type-specific shaping and scheduling engine 124, and an interface-specific shaping and scheduling engine 126. In general, the queue management system manages the storage of packets in the packet buffer, the rate shaping of traffic by traffic type and by target interface, and the dispatching of packets from the packet buffer. In particular, the queue manager manages the queuing of incoming packets and the writing of packets to and the reading of packets from the packet buffer. The queue manager maintains a type-specific queue for each different type of traffic that is stored in the packet buffer. The type-specific queues enable queued packets to be identified in the packet buffer. In an embodiment, the packets are carved into fixed size cells as they are stored in the packet buffer, and a linked list of pointers to the location of those cells is generated. The type-specific queue for each type of traffic identifies a linked list of cells, and the parameters used to maintain each type-specific queue include a head pointer, a tail pointer, and a cell count. The head and tail pointers identify the buffer locations of the head cell of the first packet in the queue and the tail cell of the last packet in the queue on a per-type basis. Because each packet is buffered in an off-chip memory and because a set of packets of the same type are identified by a head pointer, a tail pointer, and a cell count, a limited amount of on-chip memory is needed to implement the queue management system in hardware. In an embodiment, there are 4,096 (4K) separate type-specific queues supported by the queue manager.

The type-specific shaping and scheduling engine 124 applies rate shaping rules to the type-specific queues on a per-type basis. The type-specific shaping and scheduling engine also controls the scheduling of packets from the type-specific shaping and scheduling engine to the interface-specific shaping and scheduling engine 126. In an embodiment, the type-specific shaping and scheduling engine also applies weighted random early drop (WRED) to the type-specific queues. The application of WRED causes some incoming packets to be dropped or marked in times of network congestion.

The interface-specific shaping and scheduling engine 126 receives traffic that is forwarded from the type-specific shaping and scheduling engine 124. The interface-specific shaping and scheduling engine applies rate shaping rules to interface-specific queues on a per-interface basis. The interface-specific shaping and scheduling engine also controls the scheduling of packets to the MDI 110. Packets are dispatched from the interface-specific shaping and scheduling engine in response to interface-specific requests from the MDI.

The combination of the type-specific queues 122, the type-specific shaping and scheduling engine 124, and the interface-specific shaping and scheduling engine 126 enables traffic shaping to be applied individually to each different type of traffic as well as to each different interface on which traffic is output. In addition, as will be described below, the combination of the type-specific queues, the type-specific shaping and scheduling engine, and the interface-specific shaping and scheduling engine enables the queue management system to be easily adapted to many different interface combinations with simple programming controls. Throughout the description, "queuing a packet" is intended to mean placing a packet identifier (e.g., a "token" representing the packet) into a queue. That is, some identifier of a packet is placed into a queue to identify the packet in lieu of the packet content itself while the actual packet is held in a separate, typically off-chip, packet buffer. For example, a packet identifier is used to identify the location of the actual packet in an off-chip packet buffer (e.g., packet buffer 108). In an embodiment, a packet identifier is a pointer to another queue that is related to the packet.

Figure 2:
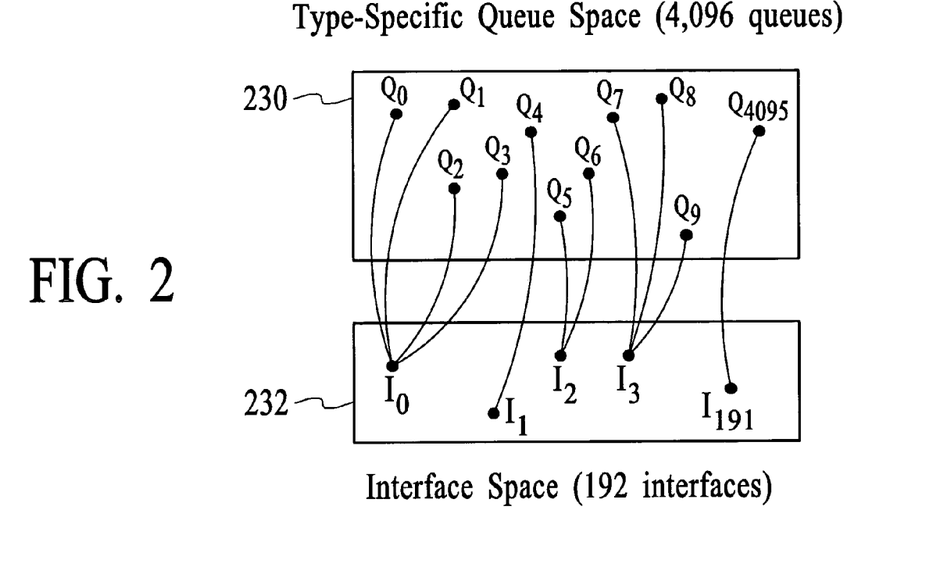
FIG. 2 is a conceptual depiction of the relationship between multiple type-specific queues in a queue space and multiple interfaces in an interface space.

FIG. 2 is a conceptual depiction of the relationship between multiple type-specific queues in a queue space 230 and multiple interfaces in an interface space 232. The conceptual depiction is provided to show the mapping of traffic types to interfaces. In the example of FIG. 2, the queue space includes 4,096 type-specific queues (i.e., queues $Q_0$-$Q_{4,095}$) and the interface space includes 192 interfaces (i.e., interfaces $I_0$-$I_{191}$), where both the queues and the interfaces are represented by the dots in the respective queue and interface spaces. As depicted in FIG. 2, the number of type-specific queues is greater than the number of interfaces and each type-specific queue is mapped to a target interface. In some instances, multiple type-specific queues are mapped to the same interface. For example, type-specific queues $Q_0$, $Q_1$, $Q_2$, and $Q_3$ are all mapped to interface $I_0$.

In accordance with an embodiment of the invention, a two stage rate shaping and scheduling system and method is implemented to control the flow of traffic to at least one output interface. The two stage rate shaping and scheduling system and method involves initially queuing incoming packets into type-specific queues and applying individual rate shaping rules to each type-specific queue. A first stage arbitration is performed to determine how contending traffic is queued from the type-specific queues to interface-specific queues. Packets that win arbitration and pass the applied rate shaping rules are queued into the interface-specific queues. Rate shaping rules are then applied to the interface-specific queues. For a higher level of quality of service (QoS) control, the interface-specific queues are further distinguished by priority, and priority-specific as well as interface-specific rate shaping rules are applied to each queue. A second stage arbitration is performed to determine how different priority traffic that is targeting the same output interface is dequeued in response to interface-specific requests.

Figure 3:
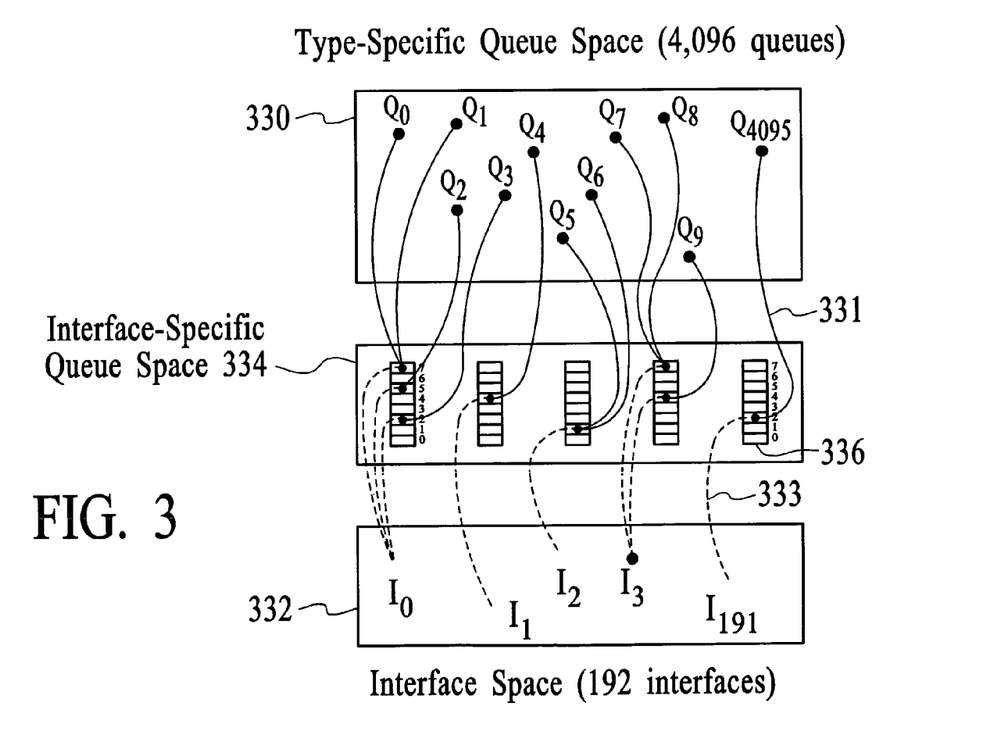
FIG. 3 is a conceptual depiction of an interface-specific queue space that exists in accordance with an embodiment of the invention to provide an interface between the queue and interface spaces that are depicted in FIG. 2.

FIG. 3 is a conceptual depiction of an interface-specific queue space 334 that exists in accordance with an embodiment of the invention to provide a bridge between the type-specific queue and interface spaces that are depicted in FIG. 2. The interface-specific queue space depicted in the embodiment of FIG. 3 includes interface-specific queues 336 that are distinguished by priority. For example, each interface-specific queue has eight priority-specific queues. From a high level functional perspective, packets are first queued into the type-specific queues in the queue space 330. Rate shaping rules are applied to each type-specific queue and packets that pass the applied rate shaping rules are queued into the target interface-specific queues in the interface-specific queue space. In an embodiment, each type-specific queue is mapped to a target interface-specific queue at a particular priority. The mapping of type-specific queues to the interface-specific queues is indicated by the solid lines 331 in FIG. 3. Note that different type-specific queues can be mapped to the same interface-specific queue at the same priority or at different priorities. For example, type-specific queues $Q_0$ and $Q_1$ are mapped to the same priority queue for interface $I_0$ (priority 7), while type-specific queues $Q_2$ and $Q_3$ are mapped to different priority queues for interface $I_0$ (priorities 5 and 2, respectively). In an embodiment, queuing packets from the type-specific queues to the interface-specific queues involves an arbitration process. This arbitration process is referred to as the "first stage" arbitration. An example of a first stage arbitration process is described in more detail below.

Interface-specific and priority-specific rate shaping rules are then applied to the interface-specific queues. For example, a different rate shaping rule can be applied to each priority level of each interface-specific queue. In the embodiment of FIG. 3, eight different rate shaping rules can be applied to the eight different priority queues for interface $I_0$. A separate rate shaping rule can also be applied to an interface as a whole. For example, the sum of the traffic sent from an interface (i.e., interface $I_0$) can be limited to a particular rate regardless of how the traffic is distributed among the different priority queues. Queues that pass the applied rate shaping rule are eligible to forward packets to the respective interfaces.

Packets that are queued in the interface-specific queues 336 are forwarded to the respective interfaces in response to interface-specific requests from the MDI. In an embodiment, the interface-specific requests are generic to the identified interface. That is, the interface-specific requests do not specify a particular priority for the traffic. Rather, the MDI provides a request for an interface (i.e., $I_0$) to send a packet. The MDI has no knowledge that there are different levels of priority within an interface-specific queue. The MDI simply makes a request to provide traffic to a particular interface regardless of the traffic type and/or priority.

Upon receiving an interface-specific request, the "second stage" arbitration is performed to determine which packet in the interface-specific queues 336 should be dequeued to the interface space 332 in response to the interface-specific request. The second stage arbitration process is reduced to a simple first-in first-out (FIFO) operation if there is only one priority queue for an interface. For example, if interface $I_0$ has only one priority level queue, then all packets targeting interface $I_0$ are queued and dispatched on a FIFO basis. However, the arbitration process can be more complex when more priority queues are active for an interface. For example, in FIG. 3, each interface has eight different priority-specific queues. With eight different priority-specific queues per interface, each interface-specific request has the potential to draw traffic from one of the eight different queues of the respective interface in response to each interface-specific request. The technique used to arbitrate among the priority-specific queues of an interface is implementation specific. Some arbitration techniques include strict priority, round-robin, and weighted fair queuing (WFQ). An example of a second stage arbitration process is described in more detail below. As depicted by the dashed lines 333 in FIG. 3, packets that win the second stage arbitration in response to interface-specific requests are dequeued from the interface-specific queue space 334 and forwarded to the target interface in the interface space 332. In the embodiment of FIG. 1, forwarding packets to the interface space involves reading the packets from the packet buffer 108.

As stated above, packets are initially written to the packet buffer 108, and both stages of traffic shaping and scheduling are accomplished using queues that contain indicators of the packets (e.g., "tokens" that represent the packets). Once both stages of traffic shaping are complete, packets are read from the packet buffer and forwarded to the MDI 110. Because the two stages of shaping and scheduling are done using queues that contain indicators of the packets instead of the actual packets themselves, packets can be managed with a single write to and a single read from one packet buffer. Additionally, the memory required to implement the interface-specific queues is relatively small because the interface-specific queues are only used to reorganize how the packets are presented for interface-specific shaping and scheduling without actually having to move the packets in memory. During the stage two shaping and scheduling, the packets continue to live in the type-specific queues, as maintained by the head and tail pointers and the cell counts, until they are transmitted in response to the interface-specific scheduling.

Figure 4:
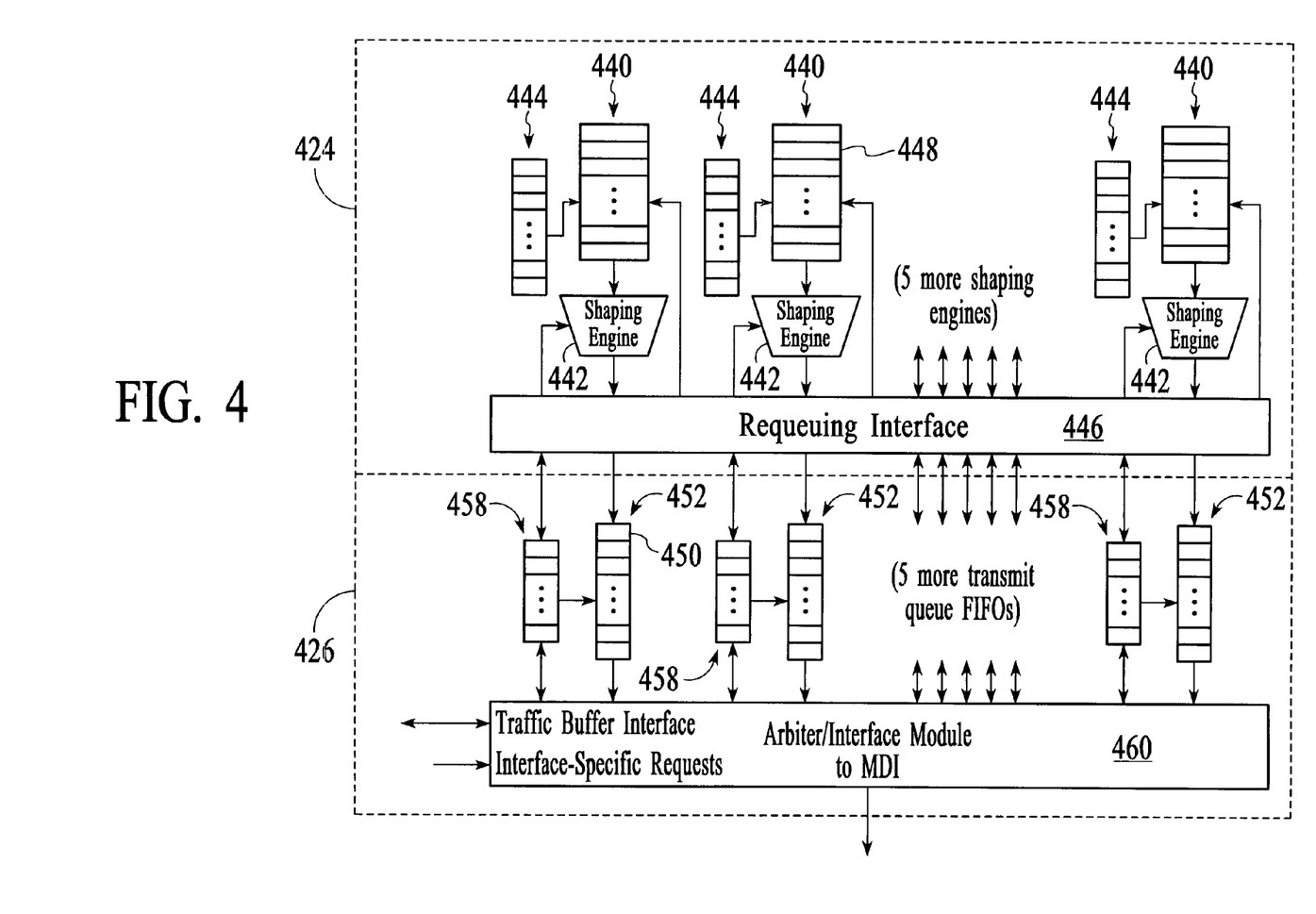
FIG. 4 depicts an embodiment of hardware-based implementations of the per-traffic type shaping and scheduling engine and the per-interface shaping and scheduling engine that are depicted in FIG. 1.

In order to achieve a high throughput queue management system, it is desirable to achieve the per-traffic type and per-interface shaping and scheduling functionality described above in a hardware-based implementation. FIG. 4 depicts an embodiment of hardware-based implementations of the type-specific shaping and scheduling engine 124 and the interface-specific shaping and scheduling engine 126 that are depicted in FIG. 1. The type-specific shaping and scheduling engine 424 includes shaping tables 440, shaping engines 442, scheduling engines 444, and a requeuing interface 446 that are used to implement rate shaping and scheduling for the 4K separate type-specific queues. In the embodiment of FIG. 4, the shaping tables are implemented in on-chip SRAM as eight banks of 512 shaping table entries for a total of 4,096 (4K) shaping table entries 448. The 4K shaping table entries correspond to the 4K type-specific queues described with reference to FIG. 1 on a one-to-one basis. The shaping table entries include information used to apply rate shaping to each different type of traffic. In the embodiment of FIG. 4, each shaping table entry includes the following fields: a target interface-specific queue ID that identifies the target interface-specific queue of the traffic, a priority field that identifies the priority of the target interface-specific queue, a pending packets count, and a credit bucket. As is described in more detail below, each per-traffic type shaping table entry may include additional fields that are used to enable additional functionality, such as enabling implementation of assumed length and length averaging features.

The shaping engines 442 apply the rate shaping rules to the type-specific queues 122. In particular, the rate shaping engines check the credit bucket that is associated with a queue to determine if a queued packet can be forwarded to its target interface-specific queue. In the embodiment of FIG. 4, there is one rate shaping engine dedicated to each bank of shaping table entries. In an embodiment, the rate shaping engines maintain a count of packets that are queued in the type-specific queues. The packet count for a type-specific queue is decremented by one every time a packet is forwarded to the target interface-specific queue. Likewise, the packet count is incremented by one every time a new packet is placed in a respective type-specific queue.

The scheduling engine 444 for each bank of shaping table entries determines which queue is up for processing by the respective shaping engine. In the embodiment of FIG. 4, each scheduling engine is implemented as an on-chip SRAM containing 1K rows (referred to herein as a "scheduling wheel") along with associated control logic. Entries in the scheduling wheel are read sequentially from top to bottom in a continually repeated cycle. In an embodiment, each entry in the scheduling wheels contains the index of the next queue to be serviced. The index is used to fetch the rate shaping parameters from the shaping tables. A rate shaping calculation is performed each time a type-specific queue is accessed. Type-specific queues that have higher rates will get multiple slots in the scheduling wheel, causing the rate shaping calculation to be performed more often for those queues. Because the rate shaping calculation logic assumes that it is being serviced at a regular interval, the distribution of slots taken by any given queue should be evenly divided into the total number of slots in the scheduling wheel. Since some type-specific queues will be taking multiple slots in the scheduling wheel, the total number of slots in the scheduling wheel is greater than the total number of type-specific queues. Because it is desirable for the scheduling wheel size to be a power of two, in the embodiment of FIG. 4, the combined scheduling engines have 8K entries.

Once a type-specific queue has been selected for processing, information from the respective rate shaping table is fetched and the rate shaping engine applies the appropriate rate shaping rule. In the embodiment of FIG. 4, hardware-based leaky buckets are used to implement rate shaping. In an embodiment, implementing the leaky bucket in hardware involves maintaining a credit value (also referred to as a credit bucket or a credit bucket value) for each queue that indicates whether or not traffic for the queue is currently conforming to the programmed rate and checking the credit value to determine if the queue is eligible to send the next packet (also referred to as a passing credit value). If the queue has a passing credit value, then the queue passes the rate shaping check, and if there is at least one pending packet in the queue, then a request to forward the next packet is sent to the requeuing interface 446. When a forwarding request is granted by the requeuing interface, the queue's packet count is decremented, a packet is dispatched to the interface-specific shaping and scheduling engine 426, and the length of the packet (e.g., a credit value that is equivalent to the length of the packet) is deducted from the credit bucket. During each table access, the credit bucket is also refreshed at a rate that corresponds to the desired rate profile. In an embodiment, a passing credit value may be designated as any positive credit value, any negative credit value, or a credit value that meets a specific threshold. It should be appreciated that there are many different ways a credit bucket can be implemented without deviating from the scope of the invention.

In known leaky bucket implementations, determining the equivalent credit value that is to be deducted from the credit bucket upon the dispatch of a packet involves storing a credit value for each packet in a local on-chip memory or accessing the stored packet in an off-chip packet buffer and reading the length field of the accessed packet. Storing a credit value for each packet in a local on-chip memory is resource intensive, while accessing stored packets in an off-chip packet buffer consumes precious memory bandwidth. In one alternative, the length of a packet can be determined after the packet is fetched from the off-chip packet buffer at the time it is transmitted to the target interface. Although this avoids the need for a large amount of extra on-chip memory or an extra off-chip buffer access, it may cause an excessive jitter effect due to the lag between the rate shaping calculation and the feedback of the actual packet length information. In view of these problems and in accordance with an embodiment of the invention, implementing rate shaping with hardware-based leaky buckets involves making an assumption about the length of each packet, using the assumed length for the initial rate shaping calculation, and then correcting the credit value for the respective queue to account for any difference between the assumed length and the actual length of the packet. The correction is done after the packet is fetched from the packet buffer for transmission and the actual length of the packet is learned.

To implement the assumed length rate shaping feature, each shaping table entry includes an assumed length field. The assumed length field identifies an assumed length value that is used in the initial rate shaping calculation. The assumed length value is the value that is deducted from the credit bucket if a queue passes its rate shaping check and a packet is forwarded. In an embodiment, the assumed length field is statically set and includes an assumed length mantissa and an assumed length exponent. Once a packet passes any subsequent rate shaping checks and is read from the packet buffer, an actual length value is obtained from the packet. The actual length value is then used to correct the credit value of the respective queue to account for any difference between the assumed length and the actual length of the packet. In an embodiment, the correction 5 involves subtracting the actual length from the assumed length and adding the difference to the current credit value. Making an initial rate shaping calculation with an assumed packet length and subsequently correcting for any differences between the assumed length and the actual length avoids the need either to maintain actual length information for each packet in the type-specific queues or to perform an extra memory read to ascertain length information before the rate shaping calculations can be completed. Although the assumed length typically does not match the actual length of the subject packet, the subsequent correction with actual length information resolves any differences to avoid injecting any error into the rate shaping operation.

In a further embodiment of the assumed length rate shaping feature, the assumed length that is used for the initial credit deduction is dynamically adjusted to reflect the average length of packets that are seen in a particular type-specific queue. For example, the average length of packets processed through each type-specific queue is maintained on a running average basis and is periodically used to update the assumed length. In an embodiment, the average length for the queue is recalculated every time an actual packet length value is returned by multiplying the returned value by a small fraction (e.g., $\frac{1}{8}$), multiplying the average length by 1 minus the fraction (e.g., $1-\frac{1}{8}=\frac{7}{8}$), and adding the resulting values together to determine the new average length value. It should be appreciated that there are many different ways the average length can be calculated without deviating from the scope of the invention. In an embodiment, the fraction is a configurable negative power of two where the exponent can have a value between $-1$ and $-4$, yielding fractions from $\frac{1}{2}$ to $\frac{1}{16}$. Dynamically adjusting the assumed length to reflect the actual average length of packets further reduces the occurrence of jitter due to the transient error in the credit bucket value that results from the difference between the actual and assumed length of packets. In an embodiment, the updating of the assumed length value is done periodically as part of the rate shaping calculation. The length correction calculation that is performed when the actual length value is returned for a particular packet should use the same assumed length value that was subtracted from the credit bucket when the respective packet was released from the type-specific queue to its target interface-specific queue. To ensure that the same assumed value is used in the deduction and correction processes, the assumed length is updated to be the same as the current average length only when there are no outstanding corrections to be made for the difference between the assumed length and the actual length of previously processed packets. A count of outstanding corrections can be maintained in the shaping table entries to ensure that the assumed length is updated only when there are no outstanding corrections to be made. Implementing the average length feature involves including an average length field and an outstanding correction count field in the rate shaping table entries. In an embodiment, the average length field includes an average length mantissa and an average length exponent that are used to identify the average length of a packet.

The requeuing interface 446 supports the queuing of packets from the type-specific queues to the interface-specific queues. In an embodiment, the requeuing interface collects requests to transmit packets from the type-specific queues and directs the requests to the appropriate interface-specific queues. The requeuing interface resolves contention when more than one type-specific queue is trying to queue a packet into the same interface-specific queue. For example, contention may exist when two packets targeting the same priority level need to queue packets into the interface-specific queues. In one implementation, when contention occurs, the requeuing interface uses a pseudo-random algorithm to select one request to forward to the interface-specific queues, rejecting the remaining contending requests. A grant signal is returned to each of the type-specific shaping engines that indicates whether or not its request was allowed to proceed to the target interface-specific queue. A second grant signal is returned from the target interface-specific queue to each of the type-specific shaping engines to indicate whether or not space is available to accept the respective packet transmit request. Only when positive grants are received from both the requeuing interface and the targeted interface-specific queue is a packet forwarded from the type-specific queue to the target interface-specific queue.

Figure 5:
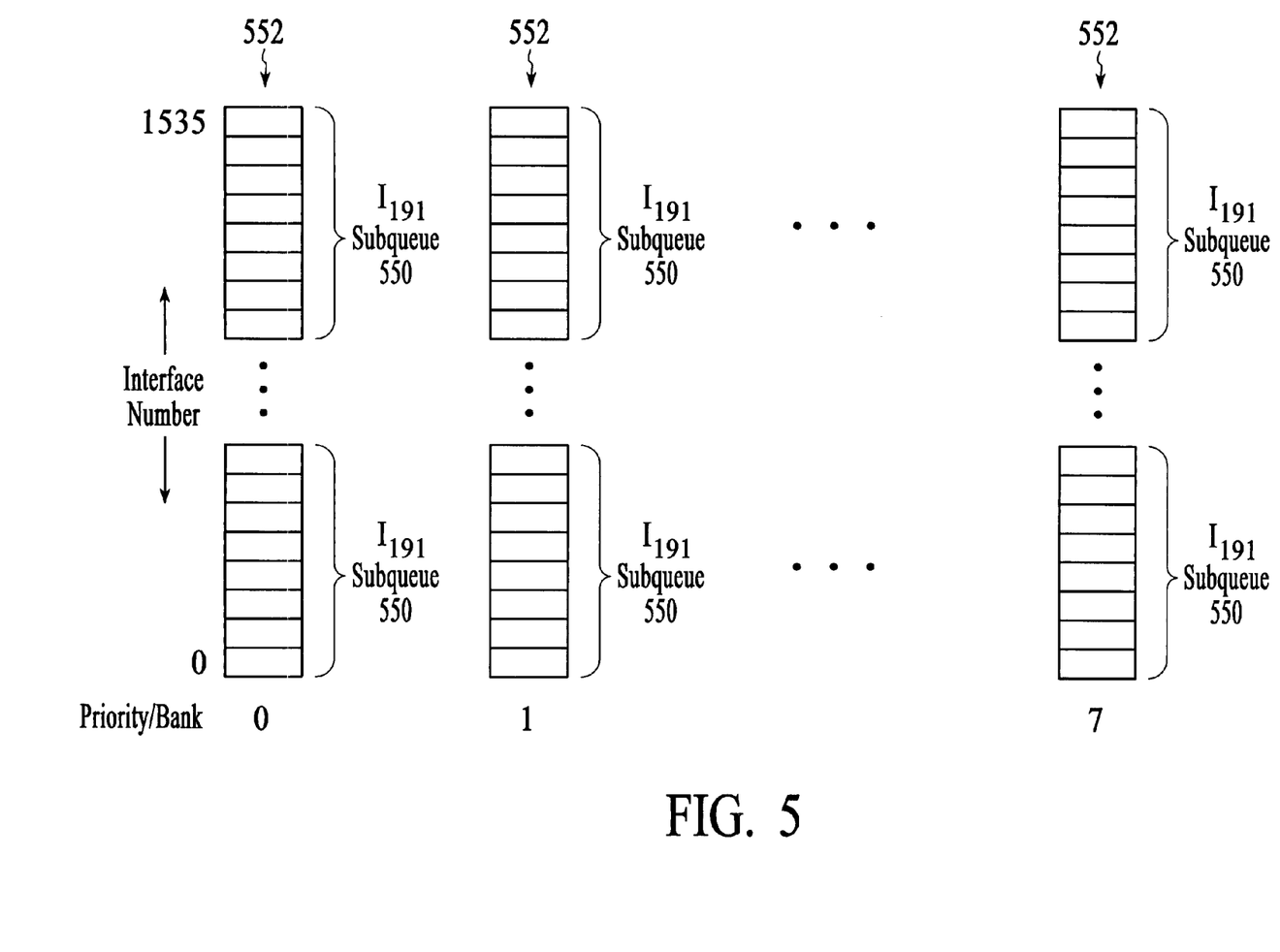
FIG. 5 depicts an expanded view of the interface-specific queue structure in FIG. 4.
Figure 6:
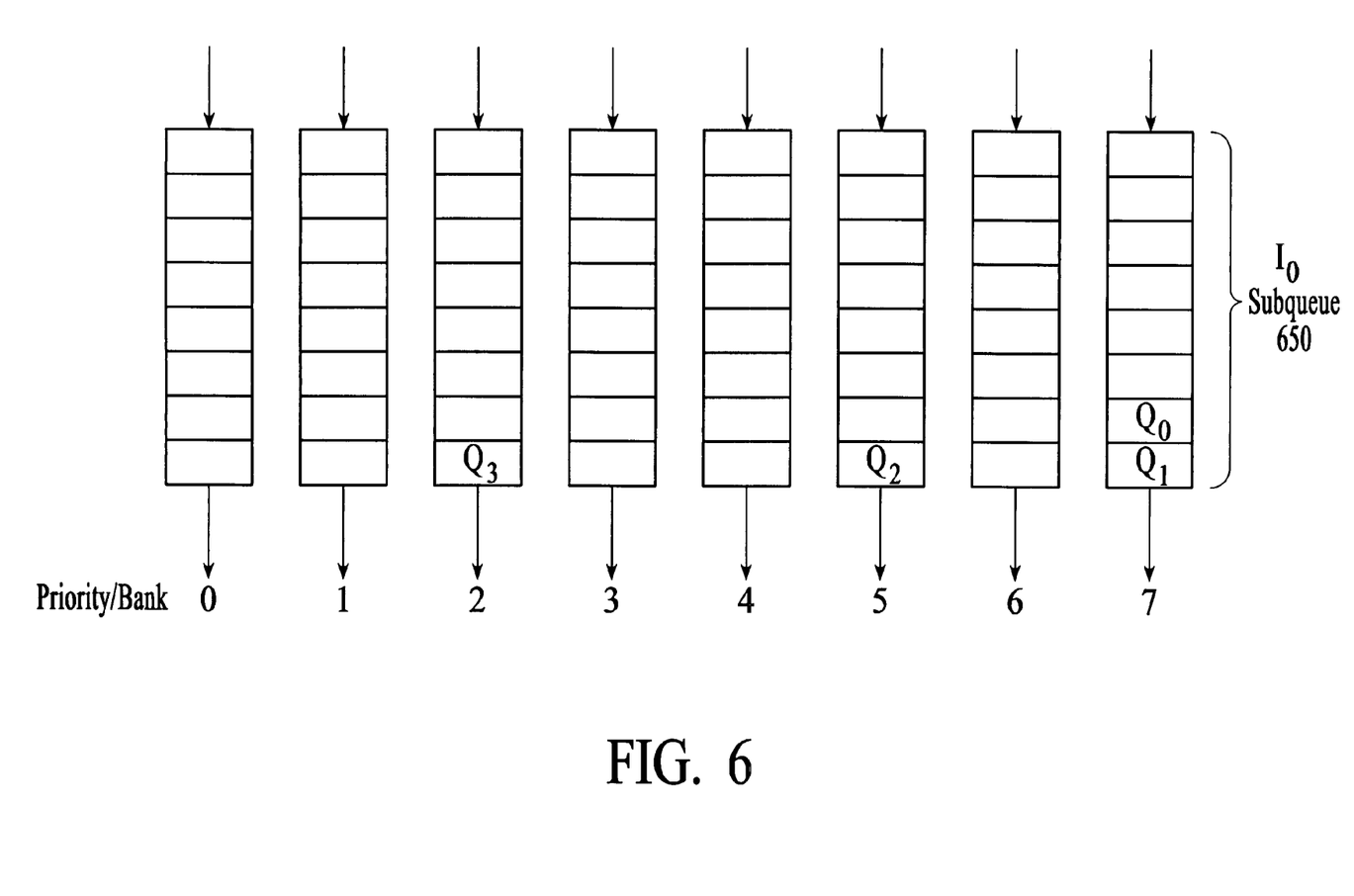
FIG. 6 depicts the eight priority FIFO queues for interface $I_0$.

The interface-specific shaping and scheduling engine 426 depicted in FIG. 4 includes an interface-specific queue for each active interface. In the embodiment of FIG. 4, the interface-specific queues are further distinguished by priority such that each interface-specific queue is made up of multiple priority-specific subqueues 450. As depicted in FIG. 4, there are eight banks 452 of priority-specific subqueues, with each bank containing 192 priority-specific subqueues that provide support for up to 192 interfaces. FIG. 5 depicts an expanded view of the queue structure in FIG. 4. As depicted in FIG. 5, each bank 552 of the queue structure is dedicated to a particular priority (i.e., priorities 0-7) and each bank is divided into 192 priority-specific subqueues 550. In the embodiment of FIG. 5, each priority-specific subqueue is a FIFO queue that has eight individual entries 554. The interface-specific queues can be implemented as FIFO queues of pointers to the type-specific queues that have packets available for transmission. As described above, implementing the interface-specific queues as queues of pointers is very memory efficient. FIG. 6 depicts an example of the eight priority-specific subqueues 650 for interface $I_0$. In the example of FIG. 6, the subqueue for priority 2 identifies one packet from type-specific queue $Q_3$, the subqueue for priority 5 identifies one packet from type-specific queue $Q_2$, and the subqueue for priority 7 identifies one packet from type-specific queue $Q_1$ and one packet from type-specific queue $Q_0$.

Referring back to the embodiment of FIG. 4, the interface-specific queue structure is implemented as eight parallel banks 452 of on-chip SRAM, one per priority level. This enables the simultaneous reading of the priority-specific subqueues 450 for all eight priority levels for a given interface. In the embodiments of FIGS. 4 and 5, each priority-specific subqueue 450 and 550 has eight individual queue entries 554 for a total of 8×192=1,536 individual queue entries per bank with a total of 12,288 queue entries across all eight banks. Although 192 interface-specific queues are described per bank 452 and 552, not all of the interface-specific queues need be active at the same time. Typically, the interface-specific subqueues are activated according to the number of active interfaces that exist and the queue entries 554 are divided and distributed among the active interface-specific queues. For example, in a configuration where only sixty-four interfaces are supported, sixty-four priority-specific subqueues are activated per priority bank, and the 1,536 individual queue entries per bank are divided such that each priority-specific subqueue contains twenty-four queue entries (1,536/64=24 queue entries). In a further embodiment, the number of queue entries allocated to each priority-specific subqueue can be programmed from among several pre-defined values such that several different sizes of FIFO may be active at the same time, thereby allowing the FIFO to be sized according to the bandwidth requirements of the interfaces they support.

With reference to FIG. 4, each bank 552 of the priority-specific subqueues also includes a queue controller 458. The queue controllers define the boundaries of the priority-specific subqueue FIFOs. In the embodiment of FIG. 4, each queue controller includes fields that identify the head pointer, tail pointer, and size of each priority-specific subqueue. Using the queue controllers, the priority-specific subqueue structure can be easily adapted to support different numbers of interfaces. Any number of interfaces from 1 to 192 can be supported by simply defining the boundaries of the priority-specific subqueues in each bank. For example, one interface can be supported by dedicating all of the queue entries in a bank to a single priority-specific subqueue and 192 interfaces can be supported by dividing the queue entries as described with regard to FIG. 5. Additionally, the number of priorities per interface can be adjusted from one to eight by controlling the banks that are active. Because the interface-specific queue structure can be easily adapted to different numbers and types of interfaces, the queue management system does not have to be custom designed for each different type of interface. For example, the same queue management system can be adapted to work with one 10 GbE port that utilizes a single interface or four OC-48 ports that utilize 192 interfaces. In an embodiment, the interface-specific queue structure is configured by an external CPU subsystem through an interface that allows programming of the parameters in the queue controllers that determine the size of the priority-specific subqueues. In the embodiment of FIG. 4, the parameters that determine which interface-specific queues are active are maintained in the arbiter/interface module 460.

Because the priority-specific subqueues 450 are a limited resource, when the sum of the traffic rates of the set of type-specific queues targeting a particular priority-specific subqueue exceeds the transmit rate for that priority-specific subqueue, the subqueue can fill up such that it begins to reject new transmit requests from the type-specific queues. If this happens for more than brief periods of time, the type-specific queues will fail to achieve their target rates. Furthermore, if more than one type-specific queue is targeting a priority-specific subqueue that is full, the ratio of the rates of traffic flowing from the type-specific queues may not be maintained. To avoid distortion in the targeted distribution of bandwidth, a mechanism can be implemented whereby the rates enforced by the shaping engines for the set of type-specific queues targeting the same priority-specific subqueue are dynamically scaled back by a common factor when the depth of the priority-specific subqueue grows beyond a threshold. A technique for dynamically scaling type-specific rates in accordance with an embodiment of the invention is described in more detail below.

In an embodiment, scaling factors having values from 0 to 7 are maintained for each of the priority-specific subqueues. The scaling factor for a priority-specific subqueue is forced to 0 when the respective priority-specific subqueue is empty, and the scaling factor for the priority-specific subqueue is increased in a controlled manner as the number of packets queued in the priority-specific subqueue increases. During each type-specific rate shaping calculation, the scaling factor corresponding to the priority-specific subqueue targeted by that type-specific queue is applied such that the credit refresh value is multiplied by 1 minus the scaling factor divided by 8 ($1-(\text{scaling}_{factor}/8)$). This reduces the rate at which credits are returned to the credit bucket by increments of ⅛ for each increment in the scaling factor, resulting in a reduction in the rate that packets will be transmitted from the associated type-specific queue(s). In this manner, as a priority-specific subqueue approaches its capacity, the rates of the type-specific queues feeding that priority-specific subqueue are dynamically reduced by equivalent proportions. This greatly reduces the likelihood that the priority-specific subqueue fills completely, which in turn avoids indiscriminate rejection of forwarding requests from type-specific queues that can result in undesired distortion of bandwidth allocation.

In a further embodiment, the calculation to determine how to adjust the scaling factor is performed each time a packet is enqueued or dequeued from an associated priority-specific subqueue by checking the depth of the subqueue against a set of programmable depth thresholds and adjusting the scaling factor according to an associated set of programmable probability thresholds. When a packet is enqueued, a pair of enqueue depth thresholds is consulted, the first threshold being less than the second, both being less than the maximum size of the priority-specific subqueue. If the queue depth is less than the first enqueue depth threshold, no adjustment in the scaling factor is made. If the queue depth is greater than the first enqueue depth threshold but less than the second enqueue depth threshold, a pseudo-random number is generated, and if the pseudo-random number is less than a first enqueue probability threshold, the scaling factor is increased by 1. If the queue depth is greater than the second enqueue depth threshold, a pseudo-random number is generated, and if the pseudo-random number is less than a second enqueue probability threshold, the scaling factor is increased by 1. Typically, the second enqueue probability threshold is higher than the first enqueue probability threshold such that the scaling factor is increased more aggressively as the queue gets closer to being full. When a packet is dequeued, a pair of dequeue depth thresholds is consulted, the first threshold being greater than the second, both being greater than 0. If the queue depth is greater than the first dequeue depth threshold, no adjustment is made. If the queue depth is less than the first dequeue depth threshold but greater than the second, a pseudo-random number is generated, and if the pseudo-random number is less than a first dequeue probability threshold, the scaling factor is decreased by 1. If the queue depth is less than the second dequeue depth threshold, a pseudo-random number is generated, and if the pseudo-random number is less than the second dequeue probability threshold, the scaling factor is decreased by 1.

A further embodiment in accordance with the invention slightly modifies the interpretation of the scaling factors by the type-specific shaping engines such that a value of 0 causes the credit bucket refresh rate to be multiplied by a programmable power of 2, scaling it upward, and a value of 1 causes no scaling of the credit refresh rate, while values 2 through 7 produce the same reduction in the refresh rate as previously described. This enhances the rate scaling functionality so that the type-specific rates are increased by a common scaling factor, preserving the ratio of their rates, when their targeted priority-specific subqueue is at or near empty, which would normally be the case when the sum of the type-specific rates is less than the transmission rate of the priority-specific subqueue. This allows excess bandwidth available at the output interface that would otherwise go unused to be distributed to the type-specific queues in proportion to their relative rates. A further embodiment provides a programmable field in the shaping table for each type-specific queue that determines how the type-specific shaping engine will interpret the scaling factor for each type-specific queue and whether it will apply the scaling factor or not for that queue.

The arbiter/interface module 460 applies per-interface rate shaping rules to queued packets and schedules packets for dispatch from the packet buffer 108 in response to interface-specific requests from the MDI 110. A variety of different algorithms may be applied to arbitrate among the priority-specific subqueues 450 of an interface to select a packet to forward in response to requests from the MDI, including strict priority, round-robin, random, and WFQ. Additionally, the arbitration logic is separately configurable on a per-interface basis to be able to apply strict priority, random, or WFQ arbitration. In a further embodiment, a WFQ on top of strict priority arbitration scheme is used.

In an embodiment, a WFQ on top of strict priority arbitration scheme is implemented using hardware-based leaky buckets by providing each priority-specific subqueue of an interface with a priority-specific rate limit. The rates are allocated to the priority-specific subqueues such that their sum is equal to the aggregate rate limit for the interface. Packets in each priority-specific subqueue of an interface are considered on a strict priority basis as long as the priority-specific rate limit is not exceeded. Once the priority-specific rate limit of a priority-specific subqueue is exceeded, the queue is not considered until all other subqueues of the interface are empty or have also exceeded their rate limits. If all of the priority-specific subqueues of the interface have either exceeded their rate limit or have no pending packets, then excess bandwidth can be distributed to the subqueues with pending packets. In an embodiment, the excess bandwidth is distributed on a strict priority basis to the other subqueues of the interface. In other embodiments, the excess bandwidth can be distributed on a round-robin or a WFQ basis. A technique for implementing WFQ in accordance with an embodiment of the invention is described in more detail below.

In the example of FIG. 4 where each interface has eight priority-specific subqueues 450, the subqueues are prioritized from 0 to 7, with 7 being the highest priority and 0 being the lowest priority. An example arbitration process involves two passes of arbitration for each packet dispatch decision. In both passes, the state of the priority-specific subqueues for the subject interface is consulted to see which of the priority-specific subqueues for that interface have pending packets. In the first pass, only those priority-specific subqueues with a pending packet and a passing credit value are considered for dispatch. The packet in the highest priority-specific subqueue meeting these criteria is selected for dispatch. If no priority-specific subqueue has packets and a passing credit value, then a second pass of arbitration is done without considering the state of the credit buckets. In an embodiment, the dispatch of packets in the second pass can be on a strict priority, a round-robin, or some other basis. The second pass of arbitration enables the distribution of extra bandwidth (i.e., the bandwidth that is left over from queues that have not used their entire allocated bandwidth). In an embodiment, both arbitration passes include a check of the aggregate bandwidth of the interface to ensure that the aggregate bandwidth has not been exceeded.

Figures 7A, 7B:
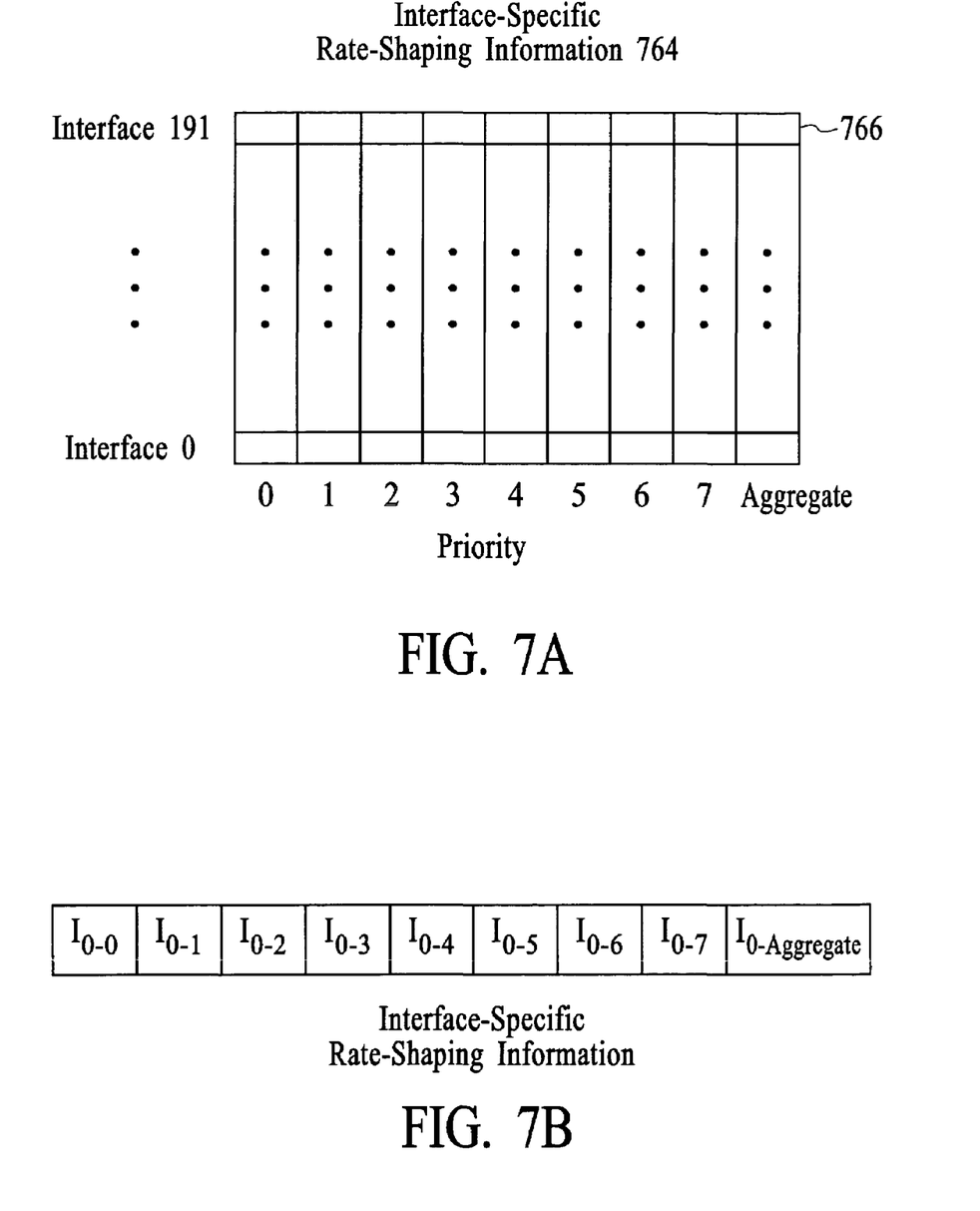
FIG. 7A depicts an example interface-specific rate shaping structure for implementing rate shaping and bandwidth allocation for the interface-specific queues.
FIG. 7B depicts an example of the rate shaping information fields for the eight priority-specific FIFO queues and the aggregate for interface $I_0$.

In an embodiment of the arbiter/interface module, rate shaping and bandwidth allocation is implemented for the interface-specific queues in hardware with queue-specific leaky buckets. FIG. 7A depicts an example set of interface-specific rate shaping information 764 for implementing rate shaping and bandwidth allocation for the interface-specific queues. The set of interface-specific rate shaping information includes rate shaping information fields 766 for each priority-specific subqueue of an interface and for each interface as a whole (the aggregate for the interface). The rate shaping information fields include credit buckets for each of the 8 priority-specific subqueues and for the interface as a whole (the aggregate credit bucket). The rate shaping information fields also include information on the refresh rate for the respective credit buckets and the interface as a whole (the aggregate refresh rate). In an embodiment, the refresh rate information for an interface is stored as a single exponent value and 9 mantissas that specify the number of credits (bytes) that should be added to each credit bucket during each update cycle.

For example purposes, it is assumed that an interface-specific request for a packet from interface 0 ($I_0$) is received from the MDI. To determine from which priority-specific subqueue a packet should be dispatched, each priority-specific subqueue for interface $I_0$ is accessed to determine if the priority-specific subqueue has packets. In addition, rate shaping information for the interface is obtained from the set of interface-specific rate shaping information. FIG. 7B depicts an example of the rate shaping information fields for interface $I_0$. When an interface-specific request is received to transmit a packet on interface $I_0$, the state of the aggregate credit bucket (obtained from field $I_{0\text{-}Aggregate}$) is checked to determine if the aggregate bandwidth limitation has been exceeded. If the credit bucket indicates that the aggregate bandwidth limitation has not been exceeded, then the state of the eight priority-specific queues for interface $I_0$ is checked and a mask of priority-specific subqueues that contain packets is generated. Referring to the example of FIG. 6 in which packets exist in the priority-specific subqueues for priorities 2, 5, and 7, a mask including the priority-specific subqueues for priorities 2, 5, and 7 would be generated. Simultaneously, the state of the leaky buckets of the eight priority-specific subqueues for interface $I_0$ is checked and a mask of subqueues that are eligible to transmit is generated. These two masks are combined to determine the set of priority-specific subqueues that are eligible to transmit and have packets pending. By way of example, round-robin or prioritized arbitration may be selected to determine which subqueue among the set of eligible subqueues is selected to dispatch a packet in response to the interface-specific request.

If none of the credit buckets of the priority-specific subqueues of an interface that have pending packets have a passing credit balance (meaning all of the queues have exceeded their maximum transmission rates) and the aggregate credit bucket still has a passing credit balance (meaning the aggregate transmission rate has not been exceeded), the arbitration can be configured to allow a particular set of subqueues to dispatch packets in excess of their respective allocated rate. Dispatching packets in excess of their respective allocated rate effectively enables priority-specific subqueues to borrow bandwidth that is left unused by priority-specific subqueues that have not utilized their entire allocated bandwidth. In an embodiment, the unused bandwidth can be distributed by strict priority, randomly, or by some other technique.

In accordance with an embodiment of the invention, the unused bandwidth for an interface is distributed among the priority-specific subqueues of the interface in a manner that preserves the relative relationships of bandwidth allocations among the priority-specific subqueues that have pending packets. In particular, the excess bandwidth can be allocated among the priority-specific subqueues in proportion to the WFQ bandwidth allocations that are defined by the rate shaping information fields 766. This "rate scaling" feature is achieved by increasing by a common multiple the credit refresh rate of all of the priority-specific subqueues that have pending packets when none of them have a passing credit balance. In an embodiment, the credit refresh rates are multiplied by a common value such that the accumulation of credits by the included subqueues increases by the same factor. For example, the refresh rate of each credit bucket can be increased by a factor of eight. For simplicity in a hardware-based implementation, the credit refresh rate for each included subqueue is multiplied by a power of two (i.e., 2, 4, 8, 16, 32, etc.). Increasing the refresh rate of credit buckets by a common multiple accelerates the return of credit values back to passing values, resulting in the distribution of the excess bandwidth to the included queues in proportion to their relative WFQ allocations. Additionally, since the credit refresh rates are accelerated only when there is unused bandwidth, the rate scaling does not alter the committed WFQ distribution among all of the priority-specific subqueues.

Reference is made to FIG. 6 for an example of the rate scaling feature. For example purposes, it is assumed that the priority 2, priority 5, and priority 7 subqueues have consumed their allocated bandwidth and that they are the only subqueues with pending packets. It is also assumed that the priority 2 subqueue has been allocated 20% of the total committed bandwidth, that the priority 5 subqueue has been allocated 10% of the total committed bandwidth, and that the priority 7 subqueue has been allocated 10% of the total committed bandwidth. When the rate-scaling feature is active, the remaining 60% of the total committed bandwidth is allocated in a 2:1:1 ratio between the priority 2, 5, and 7 subqueues, respectively, such that the priority 2 subqueue gets 50% of the total committed bandwidth (20% from the original bandwidth allocation+30% from the unused bandwidth), the priority 5 subqueue gets 25% of the total bandwidth (10% from the original bandwidth allocation+15% from the unused bandwidth), and the priority 7 subqueue gets 25% of the total bandwidth (10% from the original bandwidth allocation+ 15% from the unused bandwidth). Assuming that the priority-specific subqueues for priorities 2, 5, and 7 have a constant flow of traffic, the bandwidth will be consumed in the same 2:1:1 ratio as the original bandwidth allocations.

All the configuration parameters at various points in the system, including the shaping tables in the type-specific shaping engines (rate, target interface, priority, etc.), the interface-specific queue parameters (queue size), and the interface-specific shaping parameters (rates, etc.) may be programmed through a common interface to an external CPU subsystem. The common interface maps the various parameters to memory space visible to the CPU subsystem such that the CPU subsystem can read and write the parameters as it would normally do with its own memory subsystem.

An advantage of the above-described systems and methods is the flexibility that comes from being able to arbitrarily map the type-specific queues to a wide variety of combinations of interfaces and being able to apply sophisticated traffic management functions such as shaping, prioritization, WFQ, etc. to the queues. The above-described systems and methods allow a wide variety of products to be proliferated using the same hardware, which has several benefits. In particular, the development cost is kept down because development is done once and then used for multiple interface configurations. The same type-specific traffic grooming is available across multiple products and the same driver code can be used to support multiple products.

Although specific embodiments of the invention have been described and illustrated, the invention is not to be limited to the specific forms or arrangements of parts as described and illustrated herein. The invention is limited only by the claims.

What is claimed is:

1. A method for controlling the flow of packets through at least one output interface comprising:
    queuing packets into type-specific queues;
    applying per-type rate shaping rules to said type-specific queues;
    queuing packets, from the type-specific queues that pass said applied per-type rate shaping rules, into interface-specific queues, wherein each interface-specific queue is specific to one output interface;
    applying per-interface rate shaping rules to said interface-specific queues; and
    dequeuing packets, from the interface-specific queues that pass said applied per-interface rate shaping rules, from said interface-specific queues to at least one output interface in response to interface-specific requests.

2. The method of claim 1 further including:
    establishing priority-specific subqueues, which have different priority levels, within said interface-specific queues;
    queuing packets to particular priority-specific subqueues of said interface-specific queues; and
    applying per-priority and per-interface rate shaping rules to said priority-specific subqueues.

3. The method of claim 2 wherein dequeuing packets from said interface-specific queues in response to interface-specific requests further includes arbitrating among said priority-specific subqueues.

4. The method of claim 2 wherein applying per-interface rate shaping rules includes scaling, by a common multiple, refresh rates of credit buckets that are associated with said priority-specific subqueues that have a pending packet but do not have a passing credit value when no priority-specific subqueues have both a pending packet and a passing credit value.

5. The method of claim 2 wherein queuing packets into said interface-specific queues includes arbitrating among multiple type-specific queues that target the same priority-specific subqueue.

6. The method of claim 1 wherein queuing packets into said interface-specific queues includes writing queue identifiers of said type-specific queues into said interface-specific queues to identify packets in said interface-specific queues.

7. The method of claim 6 wherein queuing packets into said type-specific queues includes writing at least the payload of said packets into a separate packet buffer and wherein dequeuing packets from said interface-specific queues includes reading at least the payload of said packets from said separate packet buffer.

8. The method of claim 1 wherein queuing packets into said type-specific queues includes writing at least the payload of said packets into a separate packet buffer and wherein dequeuing packets from said interface-specific queues includes reading at least the payload of said packets from said separate packet buffer.

9. The method of claim 8 wherein applying said per-type rate shaping rules to said type-specific queues further includes deducting an assumed length value from a credit bucket value to determine a new credit bucket value if a type-specific queue passes an applied rate shaping rule and a packet is queued into an interface-specific queues.

10. The method of claim 9 further including correcting for the difference between said assumed length value and an actual length value after a packet is fetched from said separate packet buffer.

11. The method of claim 9 further including establishing said assumed length value as an average of the actual packet length of packets that were queued in respective type-specific queues.

12. The method of claim 1 further including:
associating a scaling factor with a first one of said interface-specific queues; and
scaling, by said scaling factor, per-type rate shaping rules that are applied to the type-specific queues that target said first interface-specific queue.

13. The method of claim 12 further including adjusting the scaling factor that is associated with said first interface-specific queue in response to packet depth of said first interface-specific queue.

14. A method for controlling the flow of packets through at least one output interface comprising:
queuing packets into type-specific queues;
applying per-type rate shaping rules to said type-specific queues;
queuing packets, from the type-specific queues that pass said applied per-type rate shaping rules, into interface-specific queues;
applying per-interface rate shaping rules to said interface-specific queues; dequeuing packets, from the interface-specific queues that pass said applied per-interface rate shaping rules, from said interface-specific queues to at least one output interface in response to interface-specific requests;
establishing priority-specific subqueues, which have different priority levels, within said interface-specific queues;
queuing packets to particular priority-specific subqueues of said interface-specific queues; and
applying per-priority and per-interface rate shaping rules to said priority-specific subqueues;
wherein applying per-interface rate shaping rules includes scaling, by a common multiple, refresh rates of credit buckets that are associated with said priority-specific subqueues that have a pending packet but do not have a passing credit value when no priority-specific subqueues have both a pending packet and a passing credit value.

15. A method for controlling the flow of packets through at least one output interface comprising:
queuing packets into type-specific queues;
applying per-type rate shaping rules to said type-specific queues;
queuing packets, from the type-specific queues that pass said applied per-type rate shaping rules, into interface-specific queues;
applying per-interface rate shaping rules to said interface-specific queues;
dequeuing packets, from the interface-specific queues that pass said applied per-interface rate shaping rules, from said interface-specific queues to at least one output interface in response to interface-specific requests;
associating a scaling factor with a first one of said interface-specific queues; and
scaling, by said scaling factor, per-type rate shaping rules that are applied to the type-specific queues that target said first interface-specific queue.

16. The method of claim 15 further including adjusting the scaling factor that is associated with said first interface-specific queue in response to packet depth of said first interface-specific queue.

17. A method for controlling the flow of packets through at least one output interface comprising:
queuing packets into type-specific queues;
applying per-type rate shaping rules to said type-specific queues; performing a first stage arbitration to determine how packets destined to contending interfaces are queued from the type-specific queues to interface-specific queues;
queuing packets, from the type-specific queues that pass said applied per-type rate shaping rules and said first stage arbitration, into the interface-specific queues, wherein each interface-specific queue is specific to one output interface;
applying per-interface rate shaping rules to said interface-specific queues; and
dequeuing packets, from the interface-specific queues that pass said applied per-interface rate shaping rules, from said interface-specific queues to at least one output interface in response to interface-specific requests.

* * * * *